United States Patent [19]

Vertanen

[11] Patent Number: 5,355,558
[45] Date of Patent: Oct. 18, 1994

[54] HINGE ASSEMBLY

[75] Inventor: Mark W. Vertanen, Creston, Iowa

[73] Assignee: Gits Manufacturing Company, Creston, Iowa

[21] Appl. No.: 103,867

[22] Filed: Aug. 9, 1993

[51] Int. Cl.$^5$ .................. A47J 37/00; E05D 11/08
[52] U.S. Cl. ........................ 16/360; 16/357; 16/370; 16/342; 16/221; 126/25 R; 220/334; 220/252; 220/333
[58] Field of Search ............ 16/348, 360, 368, 357, 16/361, 370, 346, 342, 221, 390; 126/25 R, 41 R, 38; 220/331–333, 213, 252, 334

[56] References Cited

U.S. PATENT DOCUMENTS

| 374,788 | 12/1887 | Forg | 16/342 |
|---|---|---|---|
| 959,971 | 5/1910 | Tobey | 16/360 |
| 2,008,257 | 7/1935 | Lefevre | 16/360 |
| 2,967,035 | 1/1961 | Simons | 16/370 |
| 3,384,385 | 5/1968 | Cohen et al. | 220/333 |
| 3,714,937 | 2/1973 | Linstead | 16/357 |
| 3,938,493 | 2/1976 | Bauer | 126/25 R |
| 4,062,340 | 12/1977 | Huff | 126/25 R |
| 4,159,071 | 6/1979 | Roca | 16/360 |
| 4,390,002 | 6/1983 | Daily | 126/25 R |
| 4,403,597 | 9/1983 | Miller | 126/41 R |
| 4,788,962 | 12/1988 | Mashburn | 126/25 R |

FOREIGN PATENT DOCUMENTS

| 2574108 | 6/1986 | France | 16/370 |
|---|---|---|---|
| 414442 | 12/1966 | Switzerland | 220/332 |

Primary Examiner—Lowell A. Larson
Assistant Examiner—Donald M. Gurley
Attorney, Agent, or Firm—Zarley, McKee, Thomte, Voorhees & Sease

[57] ABSTRACT

A gas kettle-type barbecue grill is provided for use on boats or other environments. The grill includes a bowl-shaped base and bowl-shaped cover which are pivotally connected by hinges on opposite sides of the grill. Each hinge includes a pair of hinge arms having four pivot connections between the base and the cover. A burner is mounted in the bottom of the base, which horizontally receives a fuel inlet line. A flavor plate is mounted on top of the burner so as to evenly distribute heat within the base of the grill. The grill grate is secured within the base by mounting brackets. The grill is mounted to a post connected to a railing on the boat or to legs, and is rotable about a vertical axis so as to block the wind from the grate, regardless of the wind direction.

30 Claims, 5 Drawing Sheets

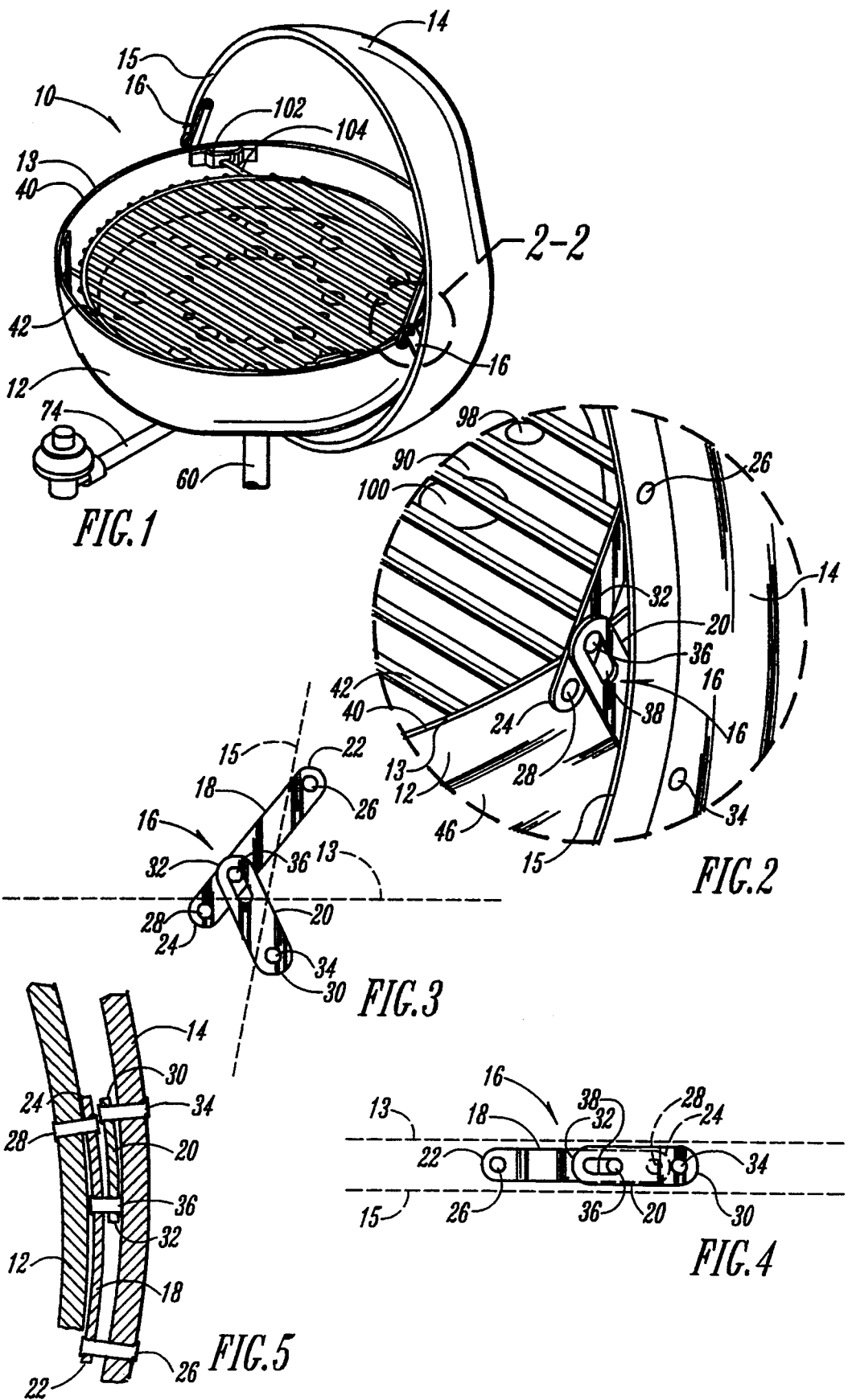

HINGE ASSEMBLY

BACKGROUND OF THE INVENTION

Barbecue grills of many shapes and sizes have been known and used for many years. Generally, grills can be classified according to the source of heat used for cooking the food: charcoal, gas, or electric. While grills can be used in many different settings, marine grills for use on boats have unique problems, as compared to grills which rest upon the ground or a fixed deck. More particularly, a marine grill must be secured to the boat. In the past, marine grills were secured to the boat railing by mounting brackets. However, such brackets did not allow the grill to be positioned so as block the wind. Also, prior art marine grills normally secured only the base to the boat, while the lid or cover merely sat upon the base, without being attached thereto. Thus, the cover was lose and rattled, and had to be set aside for access to the grill grate. As an alternative, some prior art marine grills included a hook on the cover so that the cover could be hooked to the base when the grill was opened. Other marine grills have utilized a cord or chain to keep the cover close to the grill base.

Therefore, primary objective of the present invention is the provision of an improved barbecue grill.

Another objective of the present invention is the provision of a barbecue grill which can be used on boats.

Still a further objective of the present invention is the provision of a barbecue grill wherein the cover is hinged to the base.

A further objective of the present invention is the provision of a marine barbecue grill which can be pivotially mounted on the boat so as to block the wind, regardless of wind direction.

Another objective of the present invention is the provision of a kettle type marine barbecue grill.

Yet another objective of the present invention is the provision of a gas marine barbecue grill having a single hole in the base for receipt of the fuel inlet line and for providing secondary air to the grill burner.

Another objective of the present invention is the provision of a barbecue grill having a cover hingedly connected to the base for holding the cover in numerous positions between fully open and fully closed.

Yet another objective of the present invention is the provision of a gas barbecue grill having an improved flavor plate for uniformly heating and cooking the food.

Still another objective of the present invention is the provision of a gas barbecue grill which is economical to manufacture and efficient and durable in use.

These and other objectives will become apparent from the following description of the invention.

SUMMARY OF THE INVENTION

The barbecue grill of the present invention is primarily intended for use on boats, but may also be used in other environments. The grill is a kettle-type grill having a bowl-shaped base and a cover which is connected to the base by pivoting hinges on each side of the grill. Each hinge includes a pair of arms. The first hinge arm is connected to the base and to the cover. The second hinge arm is connected to the cover and to the first hinge arm so as to provide four pivot points for each hinge. The second hinge arm also has a slot at the connection with the first hinge arm, so as to allow the second arm to move or slide with respect to the first hinge arm during opening and closing of the cover. There is sufficient friction at each of the four pivot points of the hinges so as to allow the cover to be held at any position between fully opened and closed.

The gas grill includes a single opening in the base for receiving the fuel inlet line, and for providing secondary air to the burner. No other holes are provided in the base for secondary air. A flavor plate is secured to the top of the burner so as to provide uniform heating to the food cooked on the grate of the grill. The burner is threadably received on a pedestal extending vertically upwardly through the bottom of the grill base. The pedestal has a hole for receiving the gas fuel line in a horizontal orientation. The grill grate is locked into the base by legs on the grate which are retentively received in mounting brackets on the inner wall of the base. A slotted mounting bracket is provided on the bottom of the base so that the grill can be removably connected to a mounting post which is secured to a rail on the boat. The grill mounting bracket allows the base and cover to be rotated about the vertical axis of the post so as to block the wind, regardless of wind direction. The grill mounting bracket can alternatively be attached to legs such that the grill can be used on the ground or a fixed deck.

BRIEF DESCRIPTION OF THE DRAWINGS

FIG. 1 is a perspective view of the barbecue grill of the present invention.

FIG. 2 is an enlarged perspective view taken along lines 2—2 of FIG. 1 showing one of the hinges of the grill.

FIG. 3 is an elevation view of the hinges in an open position.

FIG. 4 is an elevation view of the hinges in a closed position.

FIG. 5 is a plan view of the hinges in a closed position.

DETAILED DESCRIPTION OF THE INVENTION

Figure 6:
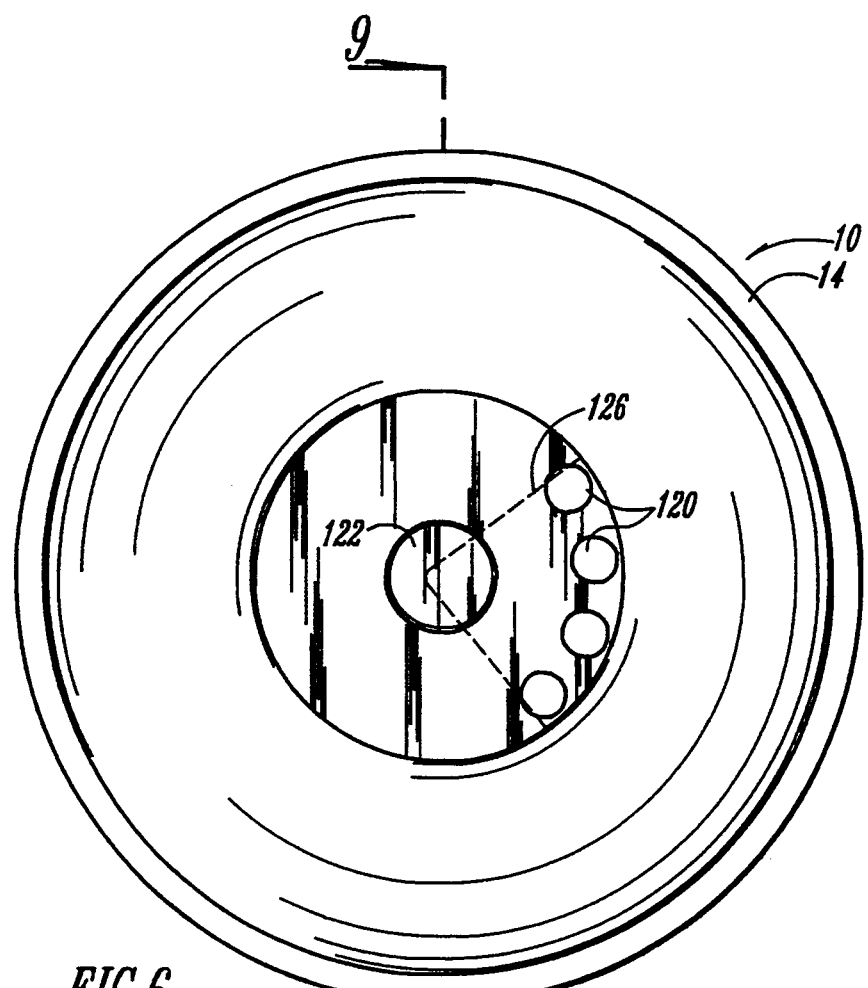
FIG. 6 is a top plan view of the grill.

The grill of the present invention is generally designated in the drawings by the reference numeral 10. The grill 10 is a kettle-type grill, having a bowl-shaped base 12 and a bowl-shaped cover 14. The cover 14 is pivotially connected to the base 12 by a pair of hinges 16 on opposite sides of the grill.

The hinges 16 are mirror images of one another, and are each comprised of a first hinge arm 18 and a second hinge arm 20. The first hinge arm 18 has a first end 22 and a second end 24. The first end 22 of the first arm 18 is pivotially connected to the cover 14 adjacent the edge 15 thereof by a rivet 26. The second end 24 of the first arm 18 is pivotally connected to the base 12 adjacent the edge 13 thereof by a rivet 28. The second arm 20 has a first end 30 and a second end 32. The first end 30 of the second arm 20 is pivotally connected to the cover 14 by a rivet 34. The second end 32 of the second arm 20 is pivotally connected to the first arm 18 by a rivet 36. Rivet 36 is located between the ends 22, 24 of the first hinge 18, but is closer to the second end 24. The second arm 20 also includes an elongated slot 38 in which the rivet 36 is slidable, such that the second arm 20 can be extended or retracted with respect to the first arm 18.

As best seen in FIG. 5, the hinge arms 18, 20 have a curved profile so as to substantially mate with the curved contour of the base 12 and the cover 14. Each hinge is movable between a closed position, shown in FIGS. 4 and 5, and the open position shown in FIGS. 2 and 3. In the closed position, the cover 14 overlies the open upper end 40 of the base 12. In the open position, the cover is pivoted approximately 100°–120° until the edge of the cover engages a mounting post 60, thereby providing access to the grate 42 mounted in the upper end 40 of the base 12. Preferably, the hinged pivot points defined by rivets 26, 28, 34 and 36 have sufficient friction such that the cover 14 is frictionally maintained in any desired position between the closed position and the fully opened position.

Figure 9:
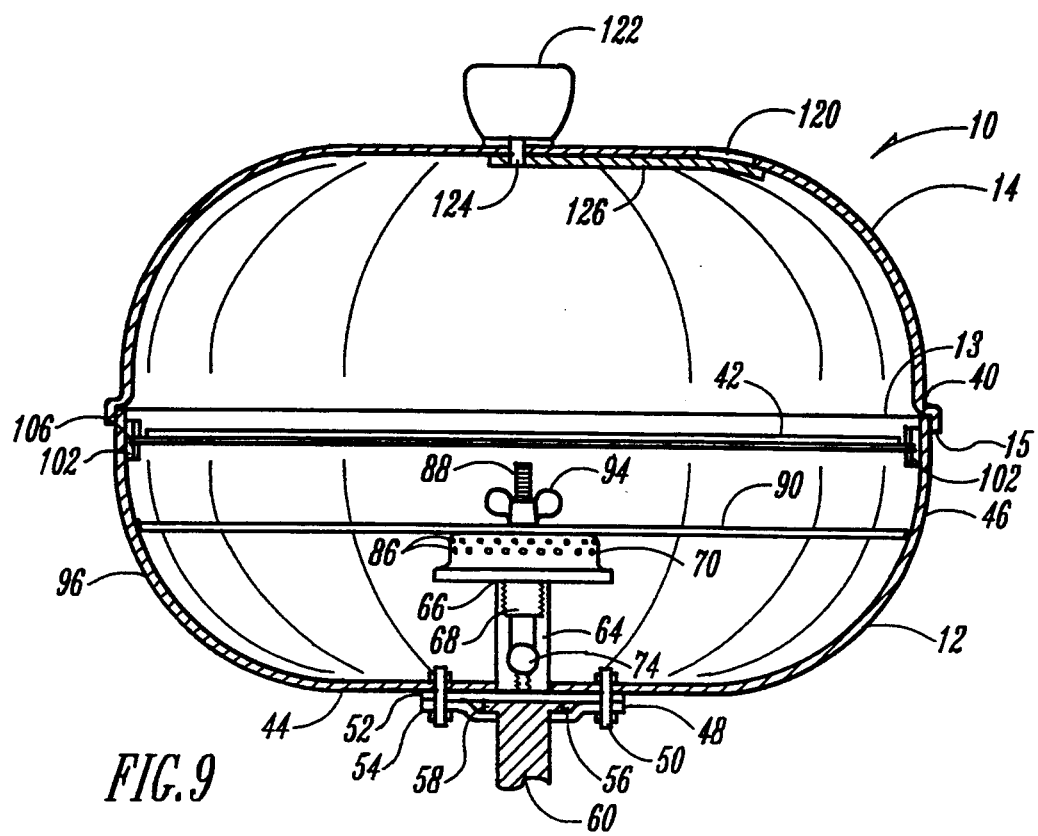
FIG. 9 is a sectional view taken along lines 9—9 of FIG. 6.
Figure 10:
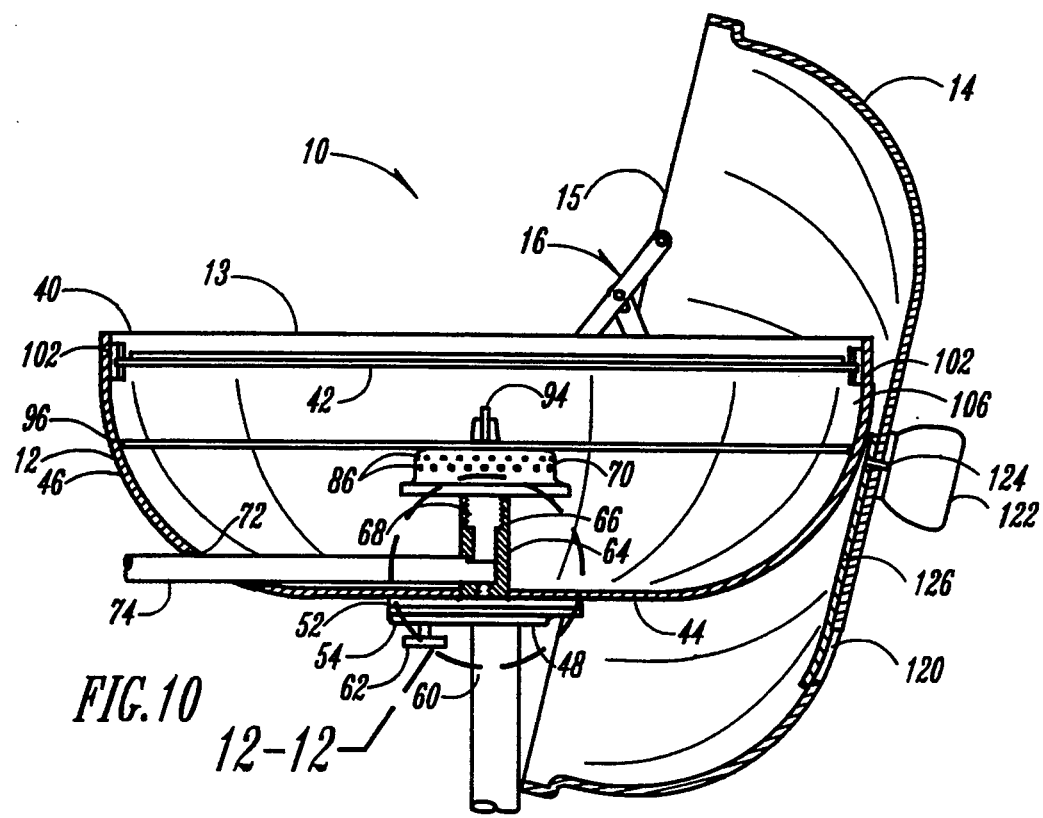
FIG. 10 is a sectional view showing the cover in a fully open position.
Figure 14:
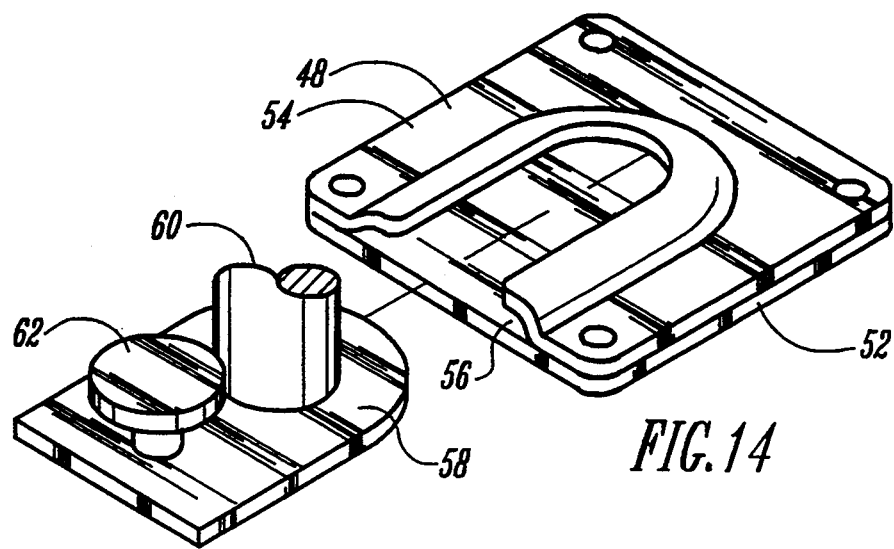
FIG. 14 is a perspective view of the grill mounting bracket and post, turned upside down for clarity.

The base 12 includes a bottom portion 44 and a side wall portion 46 which terminates in the open upper end 40. As best seen in FIGS. 9, 10 and 14, a grill mounting bracket 48 is secured to the bottom 44 of the base 12 by bolts 50. It is understood that the mounting bracket 48 may be secured to the base by welding or any other conventional means. The mounting bracket 48 includes an upper plate 52 and a lower plate 54. The lower plate 54 has a portion spaced apart from the upper plate so as to define a slot 56 between plates 52, 54. The slot 56 is adapted to receive a corresponding flat plate 58 on the upper end of a mounting post 60. The post 60 is connected to a conventional mounting bracket (not shown) for securing the grill 10 to a rail on a boat. Alternatively, the post 60 may be connected to legs in any convenient manner such that the grill 10 can be used on a horizontal surface, such as the ground or a deck. Preferably, the plate 58 is rotable within the slot 56, such that the base 12 and the cover 14 can be rotated so as to protect the grate 42 from the wind, regardless of the wind direction. A thumb screw 62 can be tightened so as to hold the grill 10 in the desired rotated position relative to the mounted post 60.

Figure 7:
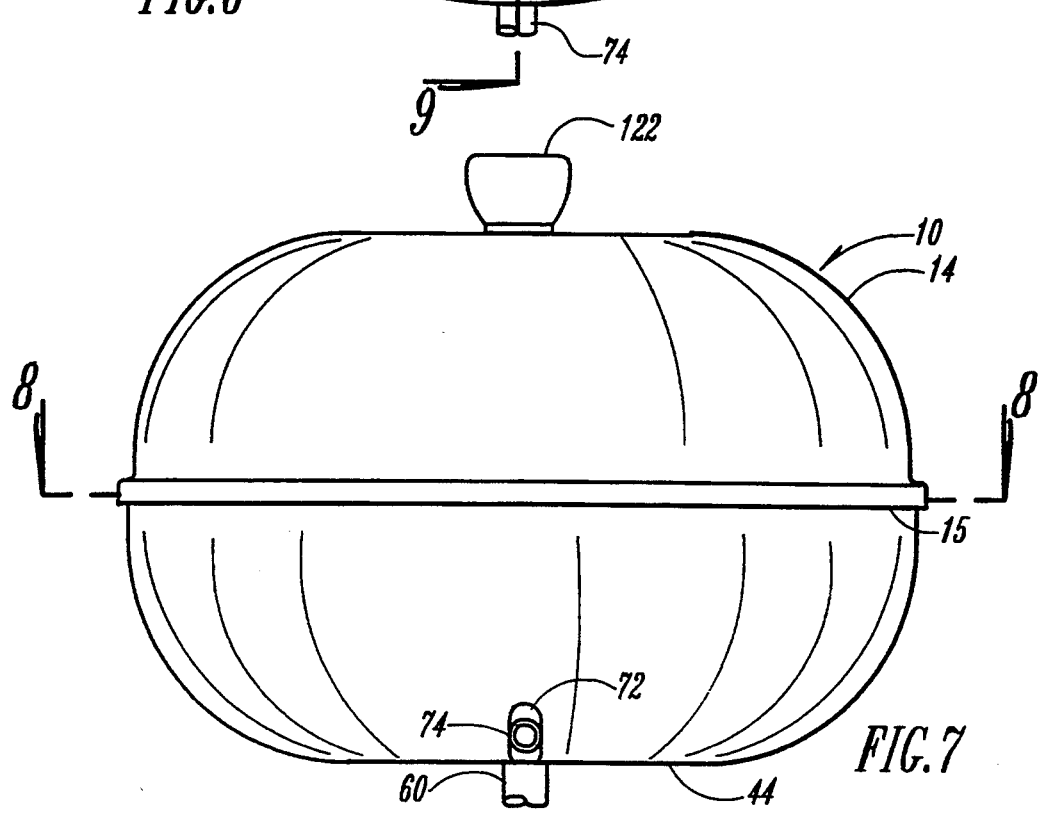
FIG. 7 is a side elevation view of the grill.
Figure 12:
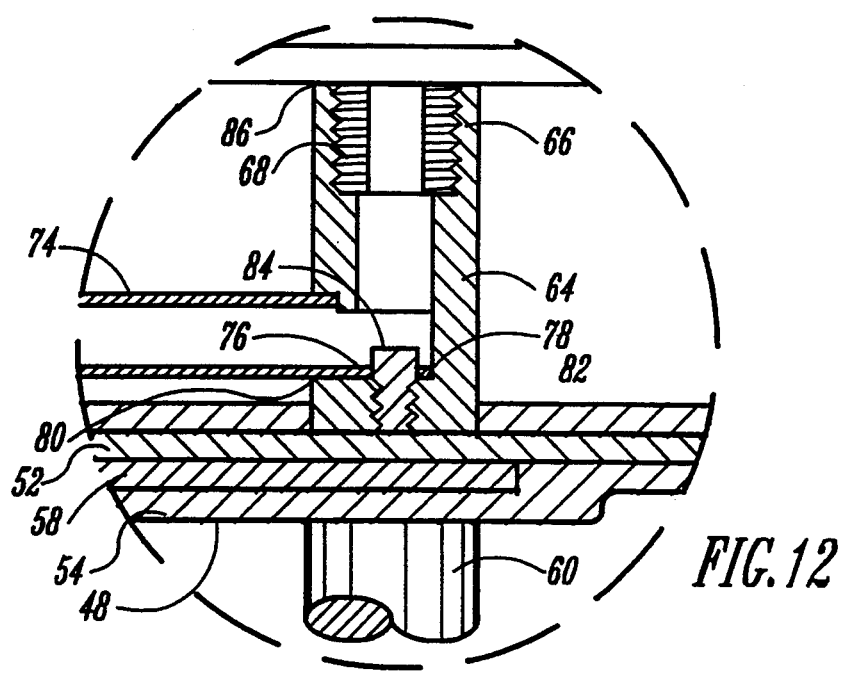
FIG. 12 is an enlarged sectional view showing the assembly of the pedestal, burner, and fuel inlet line.

A pedestal 64 fixed to the mounting bracket 48 extends upwardly through the bottom 44 of the base 12, as seen in FIGS. 9, 10 and 12. The pedestal 64 has a threaded upper end 66 for threadably receiving a threaded shaft 68 connected to a burner 70. The side wall 46 of the base 12 includes a single aperture 72 through which a fuel inlet line 74 extends, as seen in FIGS. 7 and 10. The inner end 76 of the fuel line 74 has a tab 78 extending through a hole 80 in the pedestal 64 and is secured to the closed bottom end 82 of the pedestal 64 by a screw 84. The opposite end of the fuel line 74 can be operatively connected to a fuel source, such as a propane bottle or tank (not shown), such that fuel is supplied through the line 74 and the pedestal 64 to the burner 70. The burner 70 includes a plurality of apertures 86 through which the fuel escapes for ignition and combustion so as to heat and cook the food on the grate 42. The aperture 72 in the side wall 46 of the base 20 is the only source of secondary combustion air provided to the burner 70.

A threaded stub shaft 88 extends upwardly from the top of the burner 70, as seen in FIG. 9. A flavor plate 90 has a central hole 92 such that the flavor plate 90 can be received over the stub shaft 88 and supported by the top of the burner 70, as seen in FIGS. 9 and 10. A wing-nut 94 secures the flavor plate 90 in position so as to prevent rattling of the plate while the boat is moving. The perimeter edge 96 of the plate may also engage the inner surface of the side wall 46 of the base 12 to further stabilize the flavor plate 90 within the base 12.

Figure 8:
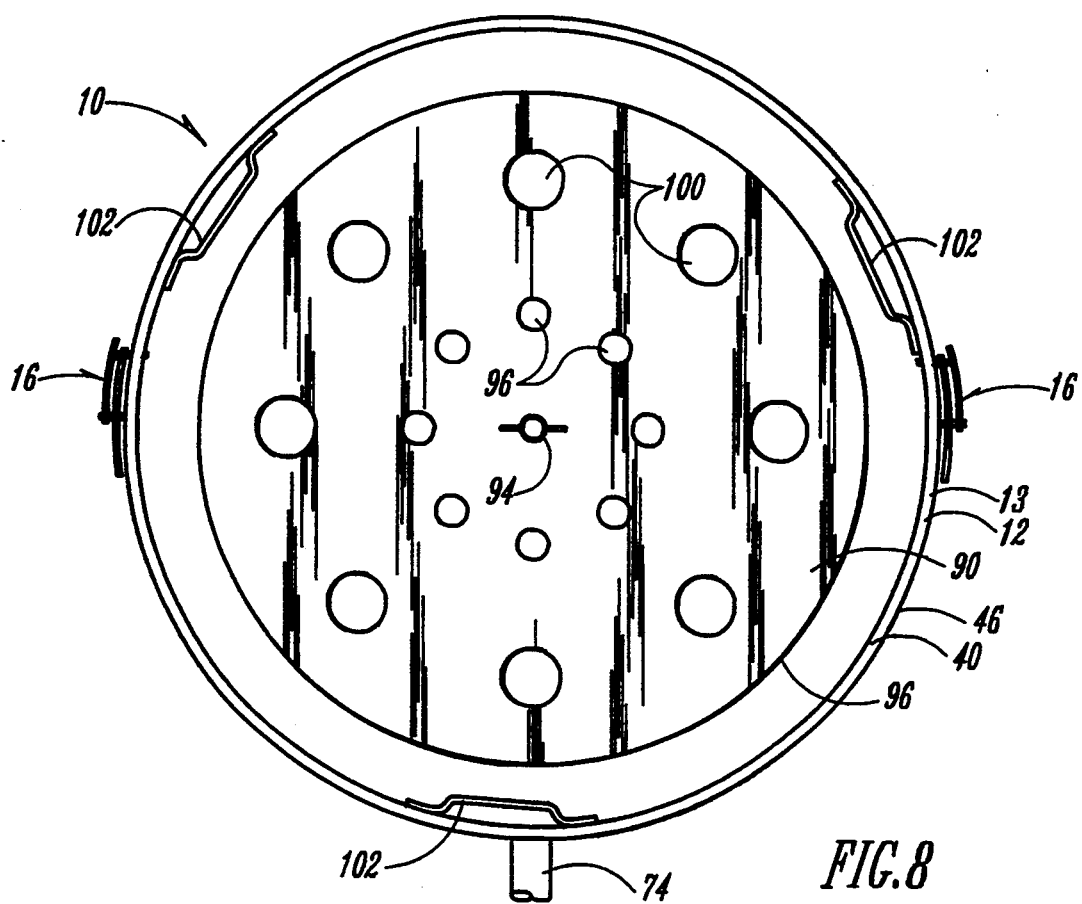
FIG. 8 is a sectional view taken along lines 8—8 of FIG. 7 and having the grate removed.

The flavor plate 90 is substantially flat, and includes a first set of holes 98 and a second set of holes 100 as best seen in FIG. 8. The holes 98 are radially spaced a first distance from the center of the plate 90, while the holes 100 are radially spaced a grater distance from the center of the plate. The holes 98 are smaller in diameter than the holes 100. The flavor plate 90 and the holes 98, 100 therein serve to evenly distribute the heat from the burner 70 across the diameter of the base 12, thereby evenly cooking the food on the grate 42. Thus, the flavor plate eliminates hot and cold spots in the grill. The plate 90 also catches drippings from the food and further burns such drippings so as to provide additional flavor to the food. If desired, wood chips can be placed on the flavor plate 90 so as to add extra flavor to the food.

Figure 11:
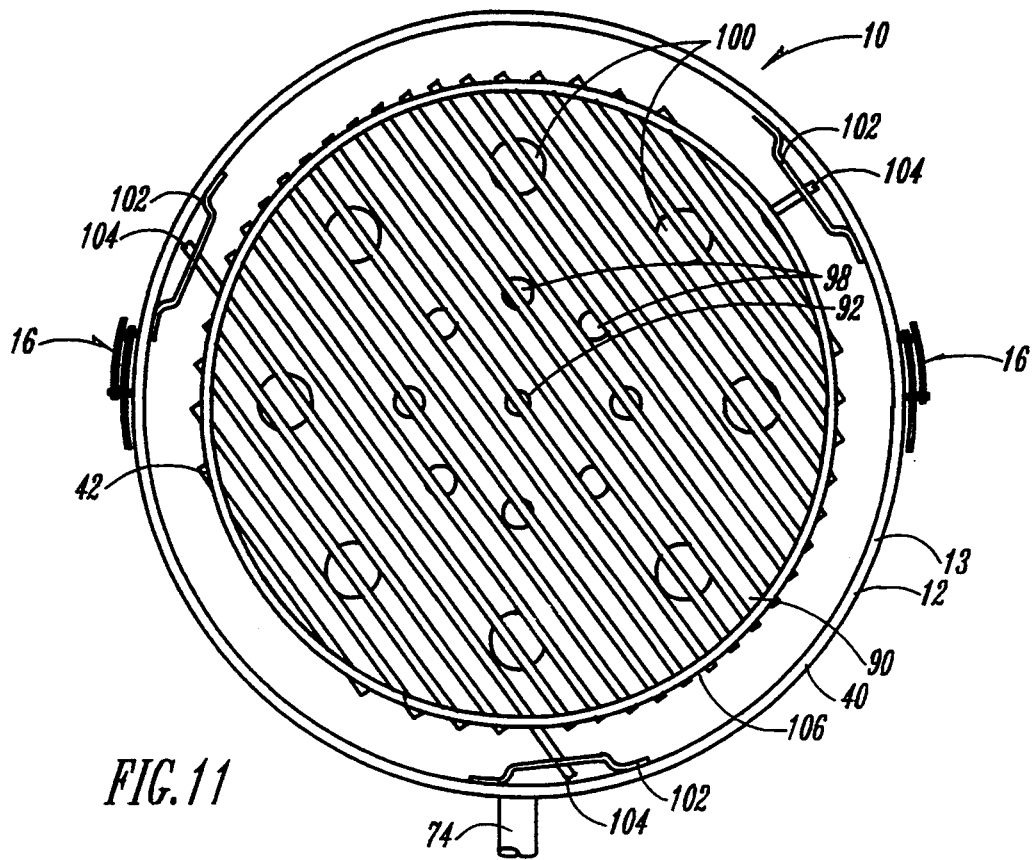
FIG. 11 is a sectional view similar to FIG. 8 and showing the grate in place.
Figure 13:
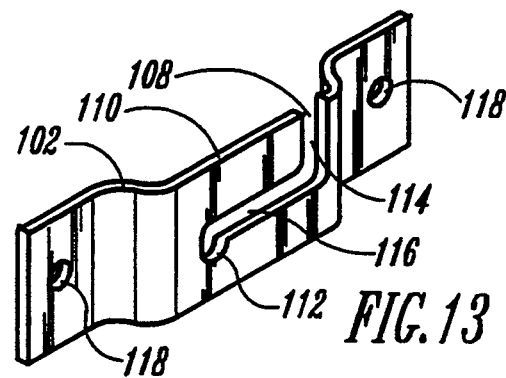
FIG. 13 is an enlarged perspective view of a mounting bracket for the grill grate.

The grate 42 is secured to the base 12 by mounting brackets 102. More particularly, as best seen in FIGS. 11 and 13, the grate 42 includes at least three legs 104 which extend from the perimeter edge 106 of the grate. A mounting bracket 102 is provided for each of the legs 104. Each mounting bracket 102 includes an L-shaped slot 108 which is open at the top edge 110 of the bracket 102, and which terminates in a detent 112. The legs 104 of the grate 42 are adapted to drop downwardly within the vertical portion 114 of the L-shaped slot 108, and the grate 42 then rotated about a vertical axis such that the legs 104 move along the horizontal portion 116 of the slot 108, until the leg drops into the detent 112 at the end of the slot 108. Thus, the grate is securely held in a horizontal position within the base 12, and is prevented from rattling when the boat is moving. The mounting brackets 102 and secured to the inner surface of the side wall 46 of the base 12 by any convenient means, such as rivets (not shown) extending through holes 118 in the opposite ends of the brackets.

As seen in FIGS. 6, 7, 9 and 10, the cover 14 of the grill 10 includes a plurality of vent holes 120 in the upper portion thereof, as seen in FIG. 6. A knob or handle 122 is centrally secured to the top of the cover 14 by a shaft 124 extending through the cover 14. A plate member 126 is secured to the shaft 124 on the inside of the cover 14. The handle 122 and the attached plate 126 are rotable such that the plate 126 can selectively cover one or more of the vent holes 120, as best seen in FIG. 6. Preferably, one vent hole 120 will remain at least partially open, and not closed by the plate 126, at all times so as to avoid extinguishing of the burner flame. The selected positioning of the plate 126 with respect to the vent holes 120 allows the user to control the internal temperature of the grill 10 when the cover 14 is in a closed position. Partially opening the cover also allows the user to control the temperature of the grill.

The preferred embodiment of the invention has been set forth in the drawings and specifications, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit or scope of the invention as further defined in the following claims.

From the foregoing, it can be seen that the present invention accomplishes at least all of the stated objectives.

What is claimed is:

1. A hinge assembly for pivotally securing a cover to a base, comprising:
   a rigid first arm having a first end pivotally connected to the base and a second end pivotally connected to the cover;
   a second arm adjacent the first arm and having a first end pivotally connected to the cover and a second end pivotally connected to the first arm;
   a rivet extending through the first and second arms to pivotally connect the second end of the second arm to the first arm; and
   the second arm having a slot adjacent the second end thereof, the rivet extending through the slot such that the second arm is slidable with respect to the first arm.

2. The hinge assembly of claim 1 wherein the connections between the arms and the base, the cover and one another comprise rivets having sufficient friction to hold the cover in a selected position relative to the base.

3. The hinge assembly of claim 1 wherein the base and the cover have mating curved surfaces, and the hinge arms each have a curved profile to fit in close relation to the curved surfaces of the base and the cover.

4. The hinge assembly of claim 1 wherein the arms are shaped complementarily to one another.

5. The hinge assembly of claim 1 wherein each arm has a primary surface, the primary surfaces being parallel to one another.

6. The hinge assembly of claim 1 wherein each arm has a curved profile, such that the arms overlap one another in a close substantially parallel relation.

7. The hinge assembly of claim 1 wherein the hinge arms are positioned between the cover and base so as to be hidden from view when the cover is in a closed position relative to the base.

8. The hinge assembly of claim 1 wherein the first arm is connected to the exterior of the base and the interior of the cover, and the second arm is connected to the interior of the cover.

9. The hinge assembly of claim 1 wherein the first arm is pivotal more than 90° from a first position to a second position.

10. The hinge assembly of claim 1 wherein the first and second arms are connected to a common side of the cover.

11. A hinge assembly for pivotally securing a cover to a base, comprising:
   a rigid first arm having a first end pivotally connected to the base and a second end pivotally connected to the cover;
   a second arm adjacent the first arm and having a first end pivotally connected to the cover and a second end pivotally connected to the first arm; and
   the base and the cover having mating curved surfaces, and the hinge arms each having a curved profile to fit in close relation to the curved surfaces of the base and the cover.

12. The hinge assembly of claim 11 further comprising a rivet extending through the first and second arms to pivotally connect the second end of the second arm to the first arm.

13. The hinge assembly of claim 12 wherein the second arm has a slot adjacent the second end thereof, the rivet extending through the slot such that the second arm is slidable with respect to the first arm.

14. The hinge assembly of claim 11 wherein the connections between the arms and the base, the cover and one another comprise rivets having sufficient friction to hold the cover in a selected position relative to the base.

15. The hinge assembly of claim 11 wherein the hinge arms are movable with respect to one another and pivotal with respect to the cover and base, such that the cover is movable between open and closed positions relative to the base.

16. The hinge assembly of claim 11 wherein the hinge arms are positioned between the cover and base so as to be hidden from view when the cover is in a closed position relative to the base.

17. The hinge assembly of claim 11 wherein the first arm is connected to the exterior of the base and the interior of the cover, and the second arm is connected to the interior of the cover.

18. The hinge assembly of claim 11 wherein the first arm is pivotal more than 90° from a first position to a second position.

19. The hinge assembly of claim 11 wherein the first and second arms are connected to a common side of the cover.

20. A hinge assembly for pivotally securing a cover to a base, comprising:
   a rigid first arm having a first end pivotally connected to the base and a second end pivotally connected to the cover;
   a second arm adjacent the first arm and having a first end pivotally connected to the cover and a second end pivotally connected to the first arm; and
   the first arm being connected to the exterior of the base and the interior of the cover, and the second arm being connected to the interior of the cover.

21. The hinge assembly of claim 20 further comprising a rivet extending through the first and second arms to pivotally connect the second end of the second arm to the first arm.

22. The hinge assembly of claim 21 wherein the second arm has a slot adjacent the second end thereof, the rivet extending through the slot such that the second arm is slidable with respect to the first arm.

23. The hinge assembly of claim 20 wherein the connections between the arms and the base, the cover and one another comprise rivets having sufficient friction to hold the cover in a selected position relative to the base.

24. The hinge assembly of claim 20 wherein the base and the cover have mating curved surfaces, and the hinge arms each have a curved profile to fit in close relation to the curved surfaces of the base and the cover.

25. The hinge assembly of claim 20 wherein the arms are shaped complementarily to one another.

26. The hinge assembly of claim 20 wherein each arm has a primary surface, the primary surfaces being parallel to one another.

27. The hinge assembly of claim 20 wherein each arm has a curved profile, such that the arms overlap one another in a close substantially parallel relation.

28. The hinge assembly of claim 20 wherein the hinge arms are movable with respect to one another and pivotal with respect to the cover and base, such that the cover is movable between open and closed positions relative to the base.

29. The hinge assembly of claim 20 wherein the hinge arms are positioned between the cover and base so as to be hidden from view when the cover is in a closed position relative to the base.

30. The hinge assembly of claim 20 wherein the first arm is pivotal more than 90° from a first position to a second position.

* * * * *